Figure 1:
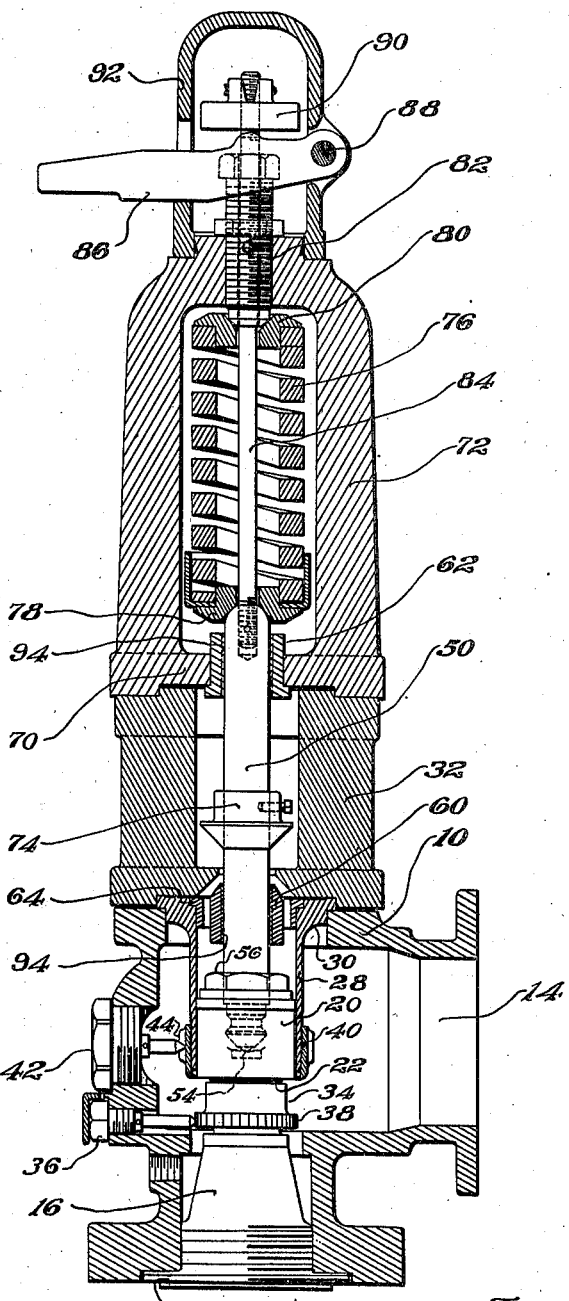

Dec. 7, 1937.  E. KLAFSTAD  2,101,682
RELIEF VALVE
Filed Nov. 4, 1935  2 Sheets-Sheet 2

Witness
Paul F. Bryant

Inventor
Erling Klafstad
by his attorneys
Fish Hildreth Cary + Junky

Patented Dec. 7, 1937

2,101,682

UNITED STATES PATENT OFFICE 2,101,682

RELIEF VALVE

Erling Klafstad, Melrose, Mass., assignor to Crosby Steam Gage and Valve Company, Boston, Mass., a corporation of Massachusetts Application November 4, 1935, Serial No. 48,149

2 Claims. (Cl. 137—53)

The present invention relates to safety or relief valves, and more particularly to such valves designed to relieve upon the occurrence of excessive pressures in steam lines and the like subjected to relatively high pressures where close regulation is necessary.

Valves of this character have been heretofore constructed with a cooperating valve disk and seat, the disk being guided in its movements by a surrounding shroud or guiding sleeve and being held against the seat by a loading spring. In this type of construction the valve spindle extends upwardly through the spring, and the thrust is transmitted to the valve through the spindle. As the size of the valve is increased together with the length of the spindle and spring, serious problems have been encountered due to the fact that the spindle under the influence of the loading spring may tend to exert a side thrust upon the valve and not only cause excessive wear but to actually cramp the disk in such a manner that it will stick in either open or closed position.

I have discovered that this inherent objection which may become accentuated with the use of large valves at high pressures can be overcome by virtually constructing a spindle section which is sufficiently massive to avoid buckling, and which is accurately guided at separated points to compel movement of the spindle in an accurate and predetermined path aligned with the path of movement of the valve disk. Any tendency on the part of the loading spring, if it exists, to exert a side thrust on the spindle is satisfactorily resisted by the guides through which the spindle operates. The spindle itself, however, merely transmits the loading thrust to the valve disk without any accompanying side or lateral thrust, and relieves the disk and its guide sleeve from undue wear or sticking. Actually the alignment of the spindle in this manner tends to aid in maintaining accurate movements of the disk and relieves the surrounding guide sleeve of the major portion of its guiding function.

In actual practice I propose to connect the spindle to the valve disk in such a manner as to permit rotational movements of the disk, but to restrain the disk against angular movements relative to the spindle. Furthermore, I apply the spring load to the remote end of this spindle section at a point not far removed from the outboard guide so that any tendency on the part of the spring to exert a side thrust is resisted adjacent the region of application. I may connect with the spindle section an extension passing outwardly lengthwise of the spring and serving as a manual connection to raise the spindle and valve from its seat when desired. This extension, however, as will be obvious from the construction, exerts no tendency on the part of the spindle to cramp it in the guide, nor can such a tendency if exerted be communicated to the disk itself.

Figure 2:
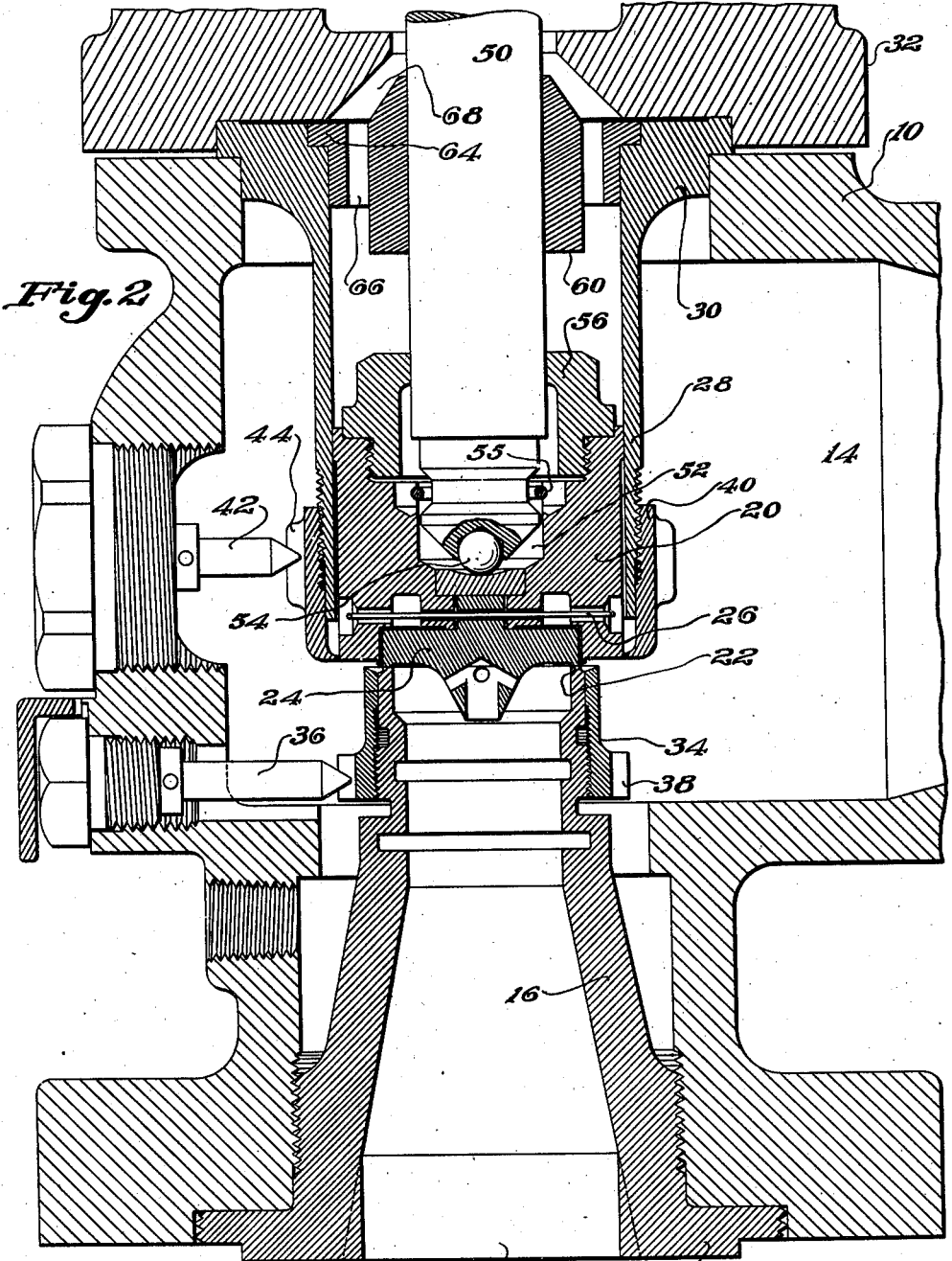

In the illustrated embodiment of the invention, Fig. 1 represents a section in elevation of a relief valve embodying the features of the invention; and Fig. 2 is a section on an enlarged scale illustrating the valve and its accompanying seat, the connection between the spindle and disk and the inboard guide member.

Referring particularly to the illustrated embodiment of the invention, it will be observed that it comprises a body portion or housing 10 having an inlet passage 12 in the bottom and an outlet passage 14 at one side. Threaded into the inlet passage is an integral nozzle section 16 provided with a flange 18 which seals the nozzle passage into the steam main or the like on which the valve is mounted, and causes the hot vapor or liquid in the inlet passage to be completely surrounded by the nozzle itself. The nozzle extends upwardly into the valve body and is tapered in the upper portion to provide clearance therebetween. It is closed by a valve disk indicated generally at 20, which engages the rim of the nozzle at 22, and when elevated from contact with the seat permits the escape of fluid directly into the outlet passage 14.

The valve disk 20 is conveniently made in two portions, the main disk of generally cylindrical outline having an insert 24 seated in the lower face connected with the main portion of the disk through a fulcrum rod 26 to permit slight rocking movements. The face of the insert contacts directly with the seat 22 and constitutes the seating portion of the disk. The disk is guided for movements to and from the seat in a guide sleeve 28 of cylindrical formation which is clamped to the valve body through a radial flange 30 engaged by a cooling extension 32.

The nozzle 16 is surrounded adjacent its upper portion by a nozzle 34 which may be adjusted with relation to the nozzle by rotating upon its threaded connection. Adjustment is maintained by engagement of the inner end of a set screw 36 with circumferential teeth or the like 38 formed upon the ring. The guide sleeve 28 is likewise provided with a sleeve ring 40, and adjusted position of this ring is maintained by a set screw 42 engaging with teeth 44. The ends of both members extend through the body and engage from the exterior. The provision of these two adjusting rings permits accurate control of the valve operation to be had.

The valve disk is loaded through a spindle section 50 which is seated at its inner end in a recess 52 formed in the spindle, and contacts the spindle through a ball thrust member 54. Withdrawal of the spindle section with respect to the disk is prevented by an inserted clip ring 55, as indicated in Fig. 2. This connection permits rotary or swiveling movements of the disk with respect to the spindle, but angular movements are avoided through the employment of a retaining nut 56 threaded in the upper portion of the valve disk and closely encircling the spindle to restrain the disk against angular movement with respect to the spindle.

The spindle section 50, as will be more clearly evident from Fig. 1, is accurately guided at separated points by means of guide sleeves 60 and 62, respectively. The lower or inboard guide sleeve is provided with a clamping flange 64, by which it is engaged and held in proper relation to the spindle. The guide sleeve has surrounding outlet passages 66 which permit in communication with the passage 68 the escape of steam or hot fluid which may have entered the chamber above the valve disk through leakage between the disk and guide sleeve. The upper guide member or sleeve 62 is mounted rigidly in the base 70 of the valve bonnet 72.

These two guide sleeves, which are accurately fitted to the spindle and aligned with respect to each other, provide means for predetermining the path of movement of the spindle and avoid any tendency on the part of the spindle to exert a side thrust upon the valve which would necessarily be communicated to the surrounding guide sleeve. The spindle section itself is sufficiently rigid to avoid buckling under the applied stresses, and when properly guided merely exerts the loading thrust upon the disk free from any sidewise tendency.

In the construction shown in the drawings, a cooling extension 32 is interposed between the valve body and the bonnet 72, this cooling extension having lengthwise openings separated by radial fins to allow for the escape of hot fluid outwardly before contact with the bonnet and enclosed spring, and to deflect any steam which may otherwise escape upwardly along the spindle. To aid in this function the spindle is provided with a deflector member 74 attached thereto as indicated in Fig. 1.

The guided spindle section is engaged at its end remote from the valve by a coiled loading spring 76 which transmits the thrust to the spindle through a spring seat 78 engaging with the rounded end of the spindle. The opposite end of the loading spring engages a fixed seat 80, the position of which may be adjusted by a threaded abutment 82 mounted in the end of the bonnet to vary the spring load upon the valve as may be necessary. The spindle section 50 may be engaged by an extension 84 threaded in the end, passing outwardly lengthwise of the spring and through the abutment 82, where it may be engaged by a manual lifting lever 86 and elevated together with the spindle section 50 and connected valve. As indicated in Fig. 1, the lifting lever is fulcrumed at 88, and engages a head 90 mounted upon the extension 84, the whole being enclosed in a cap 92.

With this construction it will be evident that the accurate guiding of the spindle section causes it to transmit the spring load to the valve disk without other tendencies, and in consequence any inaccuracy or non-uniformity of seating of the loading spring, or in fact any cause which would tend to exert a side thrust not absorbed in the spindle guides without being transmitted to the valve itself. In consequence the valve disk may move freely and easily within the guide sleeve without liability of sticking or cramping, and thus affecting the operation of the valve.

It will be observed that each of the guide sleeves which closely and accurately fits the spindle section 50 is provided with lengthwise ducts 94 which facilitate lubrication of the spindle, but which in no wise interfere with the guiding function.

What is claimed is:—

1. A relief valve comprising a housing, a valve disk, a cooperating seat, a tubular guide member surrounding and closely guiding the disk to compel straight line movement of the disk in a direction normal to the seat, a valve spindle sufficiently massive to avoid buckling under loading strain, a thrust bearing between the end of the spindle and the disk to permit rotative movement of the disk with respect to the spindle, a restraining member connected with the disk and spindle to prevent relative angular movements of the disk and spindle, spindle guides positioned adjacent opposite ends of the spindle to compel accurate movements of the spindle in a path aligned with that of the valve disk, and a loading spring engaging with the end of the spindle remote from the disk and beyond the outer spindle guide to impart a loading thrust thereto without affecting the predetermined path of movement of the spindle and connected valve disk.

2. A relief valve comprising a housing, a connected valve bonnet, a valve disk, a cooperating seat, a tubular guide sleeve within which the disk slidingly fits and is closely guided, the guide sleeve serving to accurately guide the disk within a predetermined path normal to the seat, a valve spindle sufficiently massive to avoid buckling under applied loading strains, connections between the disk and spindle to permit relative movements of rotation of the spindle and disk but preventing relative angular movements thereof, inboard and outboard guide sleeves surrounding the spindle adjacent opposite ends to predetermine the path of movement of the spindle in accurate alignment with the path of movement of the disk and avoid the imposition of side thrust upon the disk, a loading spring engaging with the outer end of the spindle beyond the outboard guide, and a spindle extension connected with the outer end of the spindle and extending through the valve bonnet to permit elevation of the spindle and disk.

ERLING KLAFSTAD.